United States Patent
Gajapala

(10) Patent No.: US 9,232,010 B1
(45) Date of Patent: Jan. 5, 2016

(54) METHOD AND APPARATUS FOR CONTEXT AWARE INTELLIGENT MESSAGE HANDLING

(71) Applicant: HERE Global B.V., Veldhoven (NL)

(72) Inventor: Kottorage Buddika Gajapala, Naperville, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/450,975

(22) Filed: Aug. 4, 2014

(51) Int. Cl.
*G06F 9/44* (2006.01)
*H04L 29/08* (2006.01)
*H04L 12/861* (2013.01)
*H04L 1/08* (2006.01)
*G06F 11/07* (2006.01)

(52) U.S. Cl.
CPC ............ *H04L 67/16* (2013.01); *G06F 11/0709* (2013.01); *G06F 11/0757* (2013.01); *G06F 11/0793* (2013.01); *H04L 1/08* (2013.01); *H04L 49/9084* (2013.01)

(58) Field of Classification Search
CPC ................................................. G06F 11/3466
USPC ........................... 717/120–135; 709/204–207
See application file for complete search history.

(56) References Cited

U.S. PATENT DOCUMENTS 5,222,240 A * 6/1993 Patel .............................. 712/218
8,869,169 B2 * 10/2014 Fountoukas .................. 719/314
2004/0153491 A1 * 8/2004 Harada ........................... 709/200
2005/0091383 A1 * 4/2005 Bender et al. .................. 709/228
2010/0293235 A1 * 11/2010 Cadoret et al. ................ 709/206

OTHER PUBLICATIONS

Mitchell, Christopher, Michael Walker, and David Rush. "CCITT/ISO standards for secure message handling." Selected Areas in Communications, IEEE Journal on 7.4 (1989), pp. 517-524.*
Genaud, Stéphane, and Choopan Rattanapoka. "A peer-to-peer framework for robust execution of message passing parallel programs on grids." Recent Advances in Parallel Virtual Machine and Message Passing Interface. Springer Berlin Heidelberg, 2005, pp. 276-284.*
Pfeifer, Tom, and Sven van der Meer. "The Active Store providing Quality Enhanced Unified Messaging." Proc. of the 5th Conference on Computer Communications, AFRICOM-CCDC. vol. 98. 1998, pp. 1-15.*

* cited by examiner

*Primary Examiner* — Satish Rampuria
(74) *Attorney, Agent, or Firm* — Alston & Bird LLP

(57) ABSTRACT

A method, apparatus and computer program product are provided for context aware intelligent message handling. In the context of a method, the method includes receiving a message, that includes a message identifier, determining if the message is dependent on an unprocessed message, causing a message status, including a message identifier, to be stored in a memory, causing the message to be stored in the memory in an instance in which the message is dependent on an unprocessed messages, receiving a message process completion indication from a downstream system and updating the message status based on the message process completion indication; determining if the message stored in the memory continues to be dependent on an unprocessed message based on the updated message status, and causing the transmission of the message to the downstream system in an instance in which the message is no longer dependent on an unprocessed message.

14 Claims, 4 Drawing Sheets

METHOD AND APPARATUS FOR CONTEXT AWARE INTELLIGENT MESSAGE HANDLING

TECHNOLOGICAL FIELD

An example embodiment of the present invention relates to message handling and, more particularly, to a method, apparatus and computer program product for context aware intelligent message handling.

BACKGROUND

Data messages may be transmitted between two or more systems, and due to the data content, size, transmission, and receiving environment, or the like, may be received in an order different that transmitted, e.g. out of sequence. Current queue based message handlers may use a single processing element, or consumer, for sequential processing of related messages, e.g. messages relating to a sequence of events. These message handlers can ensure the sequential integrity of the processing of the related messages, but not the processing order of the messages. Further, some queue based message handlers utilizing the single processing element are inefficient in regard to unrelated messages which may be unnecessarily blocked from transmission, e.g. stored in the queue during the processing of the related messages. The existing message handlers fail to provide a process for intelligently blocking related, e.g. dependent, message transmission until the completion of the prior message processing, while letting unrelated, e.g. non-dependent, messages be processed and transmitted.

BRIEF SUMMARY

A method, apparatus and computer program product are provided in accordance with an example embodiment for context aware intelligent message handling. In an example embodiment, a method is provided that includes receiving a message that includes a message identifier. The method also includes determining if the message is dependent on an unprocessed message, and causing the message status to be stored in a memory. The message status includes a message identifier. The method also includes causing the message to be stored in the memory in an instance in which the message is dependent on an unprocessed message, and receiving a message process completion indication from a downstream system and updating the message status based on the message process completion indication. The method of an example embodiment further includes determining if the message stored in the memory continues to be dependent on an unprocessed message based on the updated message status, and causing the transmission of the message to the downstream system in an instance in which the message is no longer dependent on an unprocessed message.

In an example embodiment, the method also includes determining if the memory is full, and in an instance in which the memory is not full, receiving a message. In some example embodiments, the method also includes determining if a message processing time satisfies a predetermined timeout threshold and causing the transmission of an error indication in an instance in which the message processing time satisfies the timeout threshold.

In an example embodiment, the method also includes receiving a message error indication from the downstream system and causing a retransmission of the message to the downstream system. In some example embodiments, the method also includes determining if a number of message transmissions satisfies a predetermined retry threshold; and retransmitting the message based on the determination of the number of transmissions satisfying the predetermined retry threshold. In an example embodiment the method also includes removing the message identifier from memory at a predetermined interval. In an example embodiment of the method, the message identifier further includes a message dependency identifier.

In another example embodiment, an apparatus is provided including at least one processor and at least one memory including computer program code with the at least one memory and computer program code configured to, with the processor, cause the apparatus to at least receive a message that includes a message identifier. The at least one memory and computer program code are also configured to determine if the message is dependent on an unprocessed message, and cause a message status to be stored in a memory. The message status includes a message identifier. The at least one memory and computer program code are also configured to, with the processor, cause the apparatus to cause a message to be stored in the memory in an instance in which the message is dependent on an unprocessed message, and receive a message process completion indication from a downstream system and updating the message status based on the message process completion indication. The at least one memory and computer program code are also configured to determine if the message stored in the memory continues to be dependent on an unprocessed message based on the updated message status, and cause the transmission of the message to the downstream system in an instance in which the message is no longer dependent on an unprocessed message.

In an example embodiment of the apparatus, the at least one memory and the computer program code are also configured to determine if the memory is full, and in an instance in which the memory is not full receiving a message. In some example embodiments of the apparatus, the at least one memory and the computer program code are also configured to determine if a message processing time satisfies a predetermined timeout threshold, and cause the transmission of an error indication in an instance in which the message processing time satisfies the timeout threshold.

In an example embodiment of the apparatus, the at least one memory and the computer program code are also configured to receive a message error indication from the downstream system, and cause the retransmission of the message to the downstream system. In some example embodiment of the apparatus the at least one memory and the computer program code are further configured to determine if a number of message transmission satisfies a predetermined retry threshold and retransmitting the message is based on the determination of the number of transmissions satisfying the predetermined retry threshold. In an example embodiment of the apparatus, the at least one memory and the computer program code are further configured to remove the message identifier from memory at a predetermined interval. In an example embodiment of the apparatus, the message identifier further includes a message dependency identifier.

In a further example embodiment, a computer program product is provided including at least one non-transitory computer-readable storage medium having computer-executable program code portions stored therein with the computer-executable program code portions comprising program code instructions configured to receive a message that includes a message identifier. The computer-executable program code portions comprising program code instructions are further configured to determine if the message is dependent on an unprocessed message, and cause the message status to be stored in a memory. The message status includes a message identifier. The at least one memory and computer program code are also configured to, with the processor, cause the apparatus to cause a message to be stored in the memory in an instance in which the message is dependent on an unprocessed message, and receive a message process completion indication from a downstream system and updating the message status based on the message process completion indication. The computer-executable program code portions include program code instructions further configured to determine if the message stored in the memory continues to be dependent on an unprocessed message based on the updated message status, and cause the transmission of the message to the downstream system in an instance in which the message is no longer dependent on an unprocessed message.

In an example embodiment of the computer program product the computer-executable program code portions further comprise program code instructions configured to determine if the memory is full, and in an instance in which the memory is not full receiving a message. In some example embodiments of the computer program product, the computer-executable program code portions further comprise program code instructions configured to determine if a message processing time satisfies a predetermined timeout threshold and cause the transmission of an error indication in an instance in which the message processing time satisfies the timeout threshold.

In an example embodiment of the computer program product, the computer-executable program code portions further comprise program code instructions configured to receive a message error indication from the downstream system and cause the retransmission of the message to the downstream system. In some example embodiments of the computer program product, the computer-executable program code portions further comprise program code instructions configured to determine if a number of message transmission satisfies a predetermined retry threshold; and retransmitting the message is based on the determination of the number of transmissions satisfying the predetermined retry threshold. In an example embodiment of the computer program product, the computer-executable program code portions further comprise program code instructions configured to remove the message identifier from memory at a predetermined interval.

In yet another example embodiment, an apparatus is provided that includes means for receiving a message, that comprises a message identifier. The apparatus also includes means for determining if the message is dependent on an unprocessed message, and means for causing the message status to be stored in a memory. The message status comprises a message identifier. The apparatus also includes means for causing the message to be stored in a memory in an instance in which the message is dependent on an unprocessed message, and means for receiving a message process completion indication from a downstream system and updating the message status based on the message process completion indication. The apparatus also includes means for determining if the message stored in the memory continues to be dependent on an unprocessed message based on the updated message status, and means for causing the transmission of the message to the downstream system in an instance in which the message is no longer dependent on an unprocessed message.

BRIEF DESCRIPTION OF THE DRAWINGS

Figure 1:
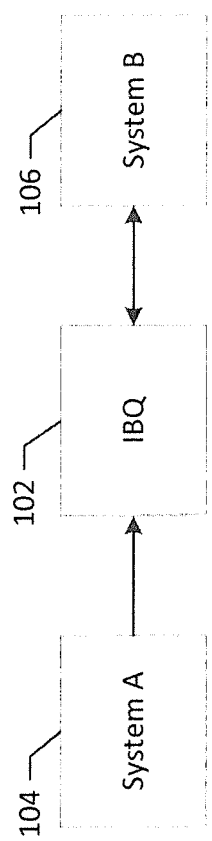
Figure 2:
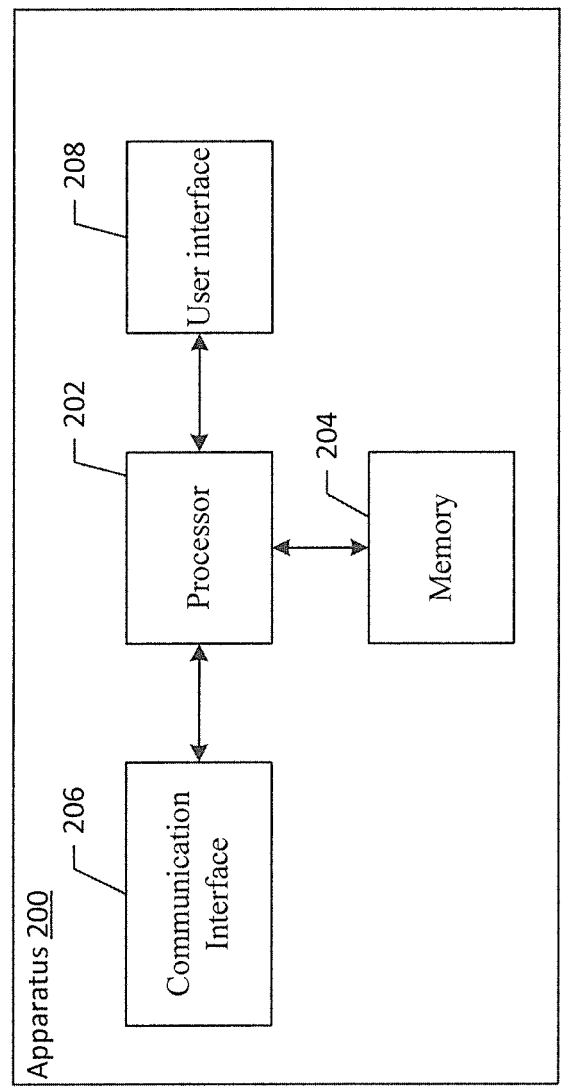
Figure 3:
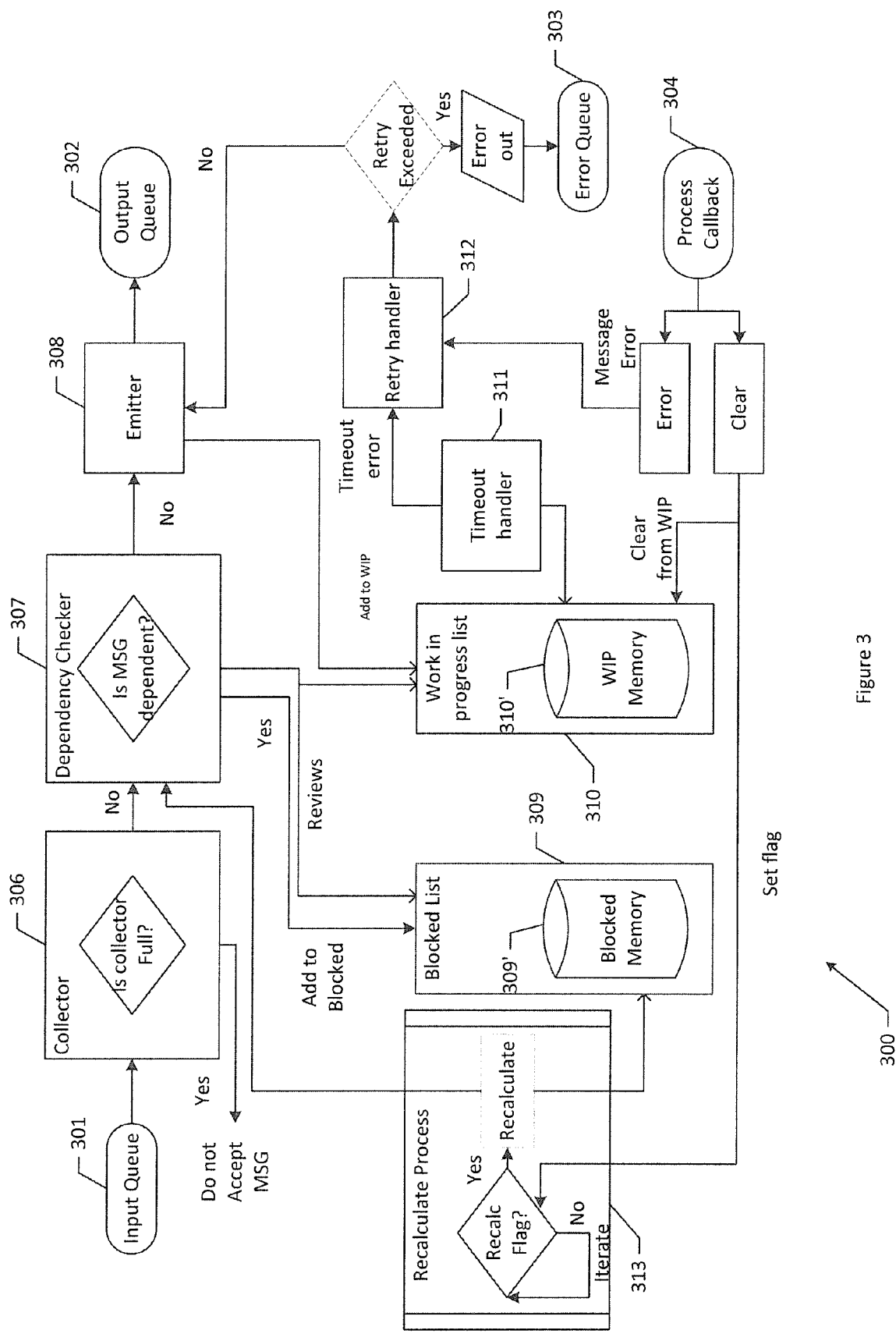
Figure 4:
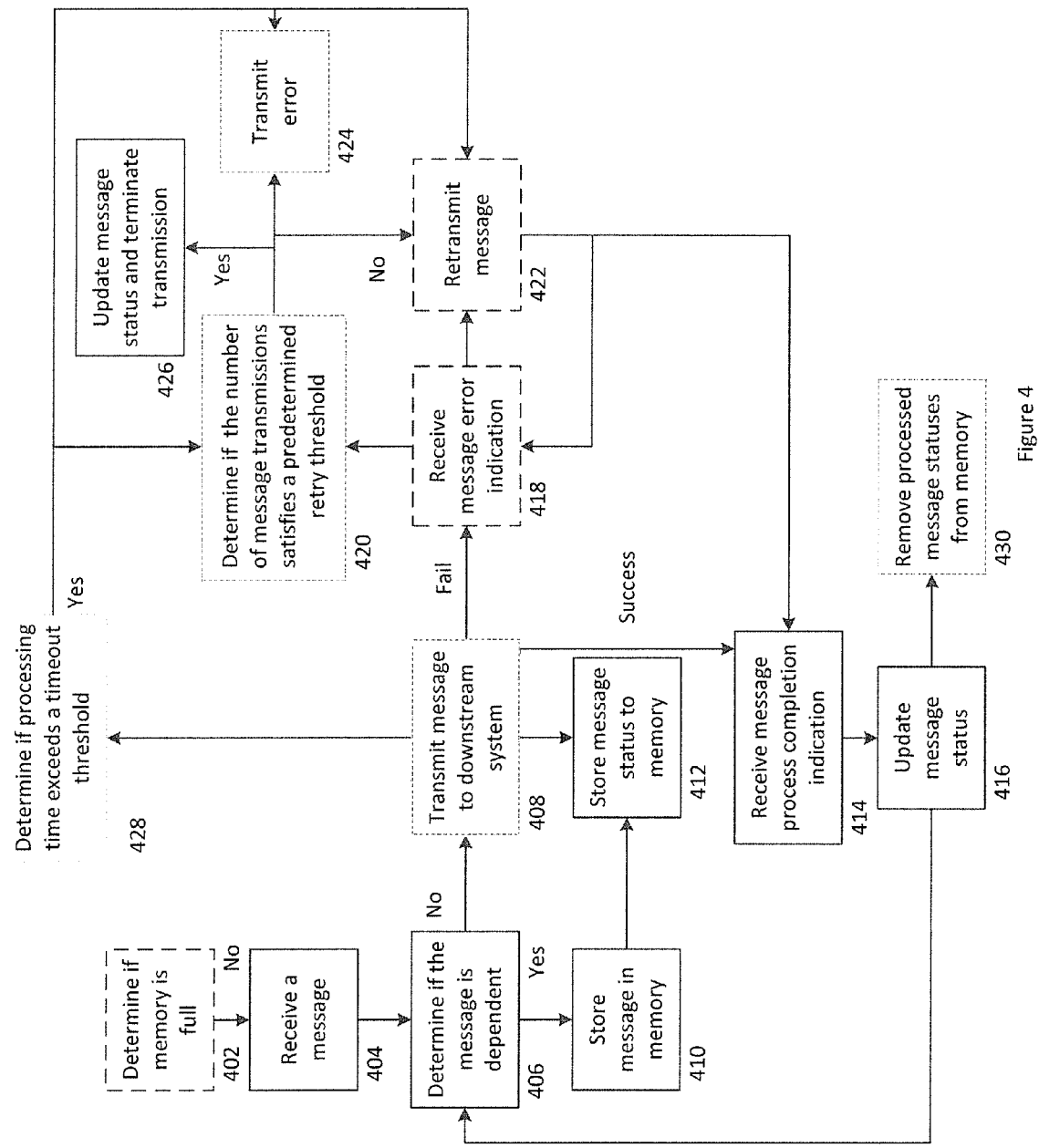

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for context aware intelligent message handling in accordance with an example embodiment of the present invention;

FIG. 3 illustrates an example data flowchart for context aware intelligent message handling in accordance with an example embodiment of the present invention; and FIG. 4 is a flow chart illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Communications Diagram

A method, apparatus and computer program product are provided in accordance with an example embodiment for context aware intelligent message handling. FIG. 1 illustrates a communication diagram including an intelligent blocking queue (IBQ) 102, in data communications with an upstream system 104 and a downstream system 106. The IBQ 102 may be embodied by any of a variety of network devices, such as a computing device in the form of a server, or the like. The upstream system 104 may send related and unrelated messages to the IBQ 102. The IBQ 102 may analyze the content of the incoming messages to identify any dependency to other messages, such as previously transmitted messages and messages that have already been blocked due to a dependency. In an instance in which the IBQ 102 determines that the message has a dependency, the message will be placed in a blocked list, e.g. blocked memory. In an instance in which the message does not have a dependency the IBQ may transmit the message to the downstream system 106. The IBQ 102 may store message identifiers and/or message status for transmitted and blocked messages in a work in progress (WIP) list/map, e.g. work in progress memory.

The downstream system 106 may notify the IBQ 102 of completion of processing of the transmitted message. The IBQ 102 may update the message status in the WIP list or remove the message identifier based on the completion message. The IBQ 102 may also determine the dependency of the messages in the blocked list based on the update to the WIP list. In an instance in which a blocked message no longer has a dependency that has not been processed, the IBQ 102 may transmit the message to the downstream system 106. Thus allowing the IBQ 102 to control the sequencing of the messages and the processing of the messages without limiting processing and transmission of unrelated messages.

The designation of the systems 104 and 106 as upstream and downstream is in reference to a single message example. One of ordinary skill in the art would immediately understand that the designations may be reversed in an instance in which the message is traveling the opposite direction, such as in bidirectional communications. Further, communications between only two systems is merely for illustration, one of ordinary skill in the art would immediately recognized that the IBQ 102 may handle communications between any number of systems.

Example Apparatus

An IBQ 102 may include or otherwise be associated with an apparatus 200 as shown in FIG. 2. The apparatus, such as that shown in FIG. 2, is specifically configured in accordance with an example embodiment of the present invention for context aware intelligent message handling. The apparatus may include or otherwise be in communication with a processor 202, a memory device 204, a communication interface 206, and an optional user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by IBQ 102 or a computing device in communication with the IBQ. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 110, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Data Flowchart for Context Aware Intelligent Message Handling

FIG. 3 illustrates an example construction design for context aware intelligent message handling in accordance with an example embodiment of the present invention. The IBQ 300 may receive a message from an upstream system, such as upstream system 104, through an input port, e.g. input queue 301. The IBQ 300 may determine if there is sufficient capacity to accept a message, using a collector 306. The collector 306 may determine that there is insufficient memory capacity, e.g. collector full, based on an indicator derived based on the number of entries in a WIP list 310/WIP memory 310' and/or the number of blocked messages in the blocked list 309/blocked memory 309' compared to a predetermined parameter, such as number of entries in the WIP list, blocked list, or the like, or remaining memory. In an instance in which there is insufficient memory, the collector may store the message in the input queue 301, or not accept the message, until sufficient memory is available.

In an instance in which the collector is not full the IBQ 300 may check the message for dependency, e.g. sequential subordination, utilizing a dependency checker 307. A message may be dependent in an instance in which it is sequentially subordinate, such as in the case of related messages which are preferably processed in a specified order. The dependency checker may determine dependency of the message based on message statuses stored in the WIP list 310, as discussed below. The message status may include a message identifier. Message identifiers may include a message dependency identifier, such as a message serial chain number, for example MSG 110-1, MSG 110-2, or the like. In another embodiment, the dependency checker may determine message dependency based on an appended message identifier, for example, if message B is dependent on message A, message B may include the message A message identifier.

The dependency checker 307 may determine direct dependency, e.g. message B depends on A. If processing of A has not been completed or no process completion indication has been received the dependency checker 307 may determine message B to be dependent. The dependency checker 307 may determine transitive dependency, e.g. message C depends on message B, message B depends on message A. In an instance in which message A is being processed or a process completion indication for message A has not been received, message B may be determined to be dependent. Message C may also be determined to be dependent, even though message C is not directly dependent on message A. The dependency checker 307 may also determine multiple dependencies, e.g. message C depends from both message A and message B (directly or transitively). In an instance in which either message A or message B has not completed processing or a process completion indicator has not been received, message C may be determined to be dependent.

In an example embodiment, the dependency checker 307 may include or be associated with a memory, such as a dependency cache, which may store the outcome of each dependency analysis to minimize computational overhead for subsequent transitive and multiple dependency analyses.

In some example embodiments, the messages may contain geographically related content. In an instance in which messages contain geographically related content, the dependency checker 307 may include capability to determine the dependency of the geographical content for sequential processing. Geographical content may include global positioning, proximity detection, or the like. In an example embodiment, the message may be dependent on a geographical location and a message sequence.

In an instance in which the message is determined to not be dependent on a message which has not completed processing, the message is delivered to an emitter 308. The emitter 308 may cause the message to be transmitted to a downstream system, such as downstream system 106, using the output queue 302. The IBQ 300 may additionally store a message status in the WIP list, for dependency determinations. The message status may include a message identifier and/or message dependency information. In some example embodiments the message dependency information may be used to generate a message dependency map, which may be associated with or a portion of the dependency cache.

In an instance in which the message is determined to be dependent on one or more messages which have not completed processing or no process completion indication has been received, the message may be stored in a blocked list. The blocked list may store the dependent messages, for processing based on process completion of superior messages. A superior message may be a message which includes message data which is preferably processed prior to the message data of a related dependent message.

The IBQ 300 may receive a process completion indication, e.g. clear, from the downstream system 106 at the process callback port 304 associated with a message which was previously transmitted to the downstream system. In response to receiving the process completion indication the IBQ 102 may update the message status (processing complete) and/or remove (clear) the message identifier in the WIP list 310. Additionally, the IBQ may set a recalculate flag for a recalculation process 313.

The recalculation process 313 may determine at a predetermined interval, such as each process cycle whether the recalculation flag is set. In an instance in which the recalculation flag is set the recalculation process 313 may cause the discrepancy checker 307 to determine the dependency status for messages in the blocked list 309. The dependency checker 307 may determine that a message which was previously stored in the blocked list 309 is no longer dependent, due to the dependency being associated with the message which the process completion indication has been received and message status updated in the WIP list 310. In an instance in which the dependency checker 307 determined that the message is not dependent on an unprocessed message, the message may be sent to the emitter 308 for transmission to a downstream system 106. Messages which the dependency checker 307 determines to be dependent on one or more messages which have not been processed or the process completion indication has not been received, may be retained in the blocked list 309.

In an example embodiment, the IBQ 102 may receive a message error indication associated with a transmitted message at the process call back port 304. A retry handler 312 may receive the message error indication from the process callback 304 port and cause the message to be retransmitted by the emitter 308. In an example embodiment, the retry handler 312 may determine the number of transmissions of the message and compare the transmission number to a predetermined retry threshold. In an instance in which the retry handler 312 determines that the number of transmissions satisfies the retry threshold, the retry handler may terminate transmission of the message. In some example embodiments, the retry handler 312 may also remove the message from WIP list 310 and/or update the message status in the WIP list, and set the recalculate flag to allow dependent messages to be processed.

In an example embodiment, a timeout handler 311 may be associated with the WIP list 310. The timeout handler 311 may include a timer, not shown. The timer may be initiated when the message is transmitted to the downstream system 106. The timeout handler may determine if the timer satisfies a predetermined timeout threshold. In an instance in which the time out handler determines that the timeout threshold is satisfied, the timeout handler may send a timeout error indication to the retry handler 312. The retry handler may cause the retransmission of the message to the downstream system 106, as discussed above.

In an example embodiment, the retry handler 312 may generate an error indication, e.g. error out. The error indication may include the message identifier and the type of error received, e.g. timeout error, message error, or retry threshold. The error indication may be transmitted to user interface for display, other systems, e.g. upstream system 104, downstream system 106, or the like to be logged for system operational analysis, etc.

In an example embodiment, the IBQ 300 may remove message statuses from the WIP list 310 at a predetermined interval. The predetermined interval may be based on time such as 5 minutes, 10 minutes, 5 hours, or any other time interval. In an example embodiment, the predetermined interval may be based on time and dependency, such as no messages received with dependency to the message within the previous 5 minutes. In another example the predetermined interval may be based on a number of entries, such as retaining the last 50, 100, or 500 message statuses and removing the oldest entry when a new message is added.

In the example embodiment depicted in FIG. 3 and described above, the various elements, e.g., the input queue 301, the collector 306, the dependency checker 307, the emitter 308, the output queue 302, the retry handler 312, the error queue 303, the timeout handler 311, the work in progress list 310 and the blocked list 309 may be embodied or otherwise associated with the IBQ 300. For example, the IBQ 300 may include one or more memory devices that may embody the input queue 301, the output queue 302, the error queue 303, the blocked list 309 and/or the work in progress list 310. In addition, the IBQ 300 may include a processor that may be specifically configured, such as in response to execution of computer program instructions, to function as the collector 306, the dependency checker 307, the emitter 308, the retry handler 312 and the timeout handler 311.

Example Process for Context Aware Intelligent Message Handling

Referring now to FIG. 4, the operations performed, such as by the apparatus 200 of FIG. 2, for context aware intelligent message handling are illustrated. As shown in block 402 of FIG. 4, the apparatus 200 may include means, such as a processor 202, a memory 204, a communications interface 206, or the like, configured to determine if the memory is full. The communications interface 206 may receive an indication of an incoming message from an upstream system, such as upstream system 104, which is communicated to the processor 202. The processor 202 may determine if sufficient memory is available based on the amount of message data stored in the memory 204, such as the blocked memory 309', WIP memory 310', or the like. The processor 202 may compare the available memory to a predetermined threshold and/or the size of the incoming message.

In an instance in which the processor determines there is insufficient memory, the message may be temporarily stored in an input buffer queue, or not accepted. In an instance in which there is sufficient memory, the process may proceed at block 404 receive a message.

As shown in block 404 of FIG. 4, the apparatus 200 may include means, such as a processor 202, communications interface 204, or the like, configured to receive a message. The processor 202 may receive a message from the communications interface 206 which may, in turn, receive the message from an upstream system 104 through wired or wireless communications. The message may include a message identifier. In some embodiments, the message may include message dependency information, such as a message dependency identifier, as described at block 412.

As shown at block 406, of FIG. 4, the apparatus 200 may include means, such as a processor 202, or the like, configured to determine if the message is dependent on an unprocessed message. The processor 202 may determine if the message is dependent on one or more messages and the status of the messages from which the message depends, based on one or more messages statuses stored in a memory 204, such as WIP memory 310'. The processor 202 may determine dependency based on direct, transitive, or multiple dependencies.

The processor 202 may determine direct dependency, e.g. message B depends on A. For example, if processing of A has not been completed or no indication of completion has been received the processor 202 may determine message B to be dependent. The processor 202 may also determine transitive dependency, e.g. message C depends on message B, and message B depends on message A. In an instance in which message A is being processed or a process completion indication for message A has not been received, message B may be determined to be dependent. Message C may also be determined to be dependent, even though message C is not directly dependent on message A based on the dependency of message B on message A. The processor 202 may also determine multiple dependencies, e.g. message C depends from both message A and message B (directly or transitively). In an instance in which either message A or message B has not completed processing or a process completion indicator has not been received, message C may be determined to be dependent.

The storage and updating of message statuses used to determine dependency is described below at blocks 412 and 416, respectively. In an instance in which the message is determined to not be dependent on an unprocessed message, the process may continue at block 408 by transmitting the message to a downstream system. In an instance in which the message is determined to be dependent on an unprocessed message, the process may continue at block 410 by storing the message in a blocked list.

As shown in block 408, of FIG. 4, the apparatus 200 may include means, such as a processor 202, or the like, configured to transmit a message to a downstream system. The processor 202 may cause the communications interface 206 to transmit the message to a downstream system, such as downstream system 106 using wired or wireless communications. The processor 202 may also cause a message status to be stored in a memory, as described at block 412.

In an instance in which the upstream system successfully processes the message the process may continue at block 414, by receiving a message process completion indication. In an instance in which the upstream system fails to successfully process the message, the process may continue at block 418, by receiving a message error indication.

As shown at block 410 of FIG. 4, the apparatus 200 may include means, such as a processor 202, memory 204, or the like, configured to store the message in a memory. In response to the processor determining that the message is dependent on an unprocessed message, the processor 202 may cause the message to be stored in a memory, such as the blocked memory 309' to await processing of the message or messages from which the message depends. The processor 202 may also cause the message status to be stored in a memory at block 412.

As shown at block 412 of FIG. 4, the apparatus 200 may include means, such as a processor 202, memory 204, or the like, configured to store a message status in a memory. The processor 202 may cause the message to be stored in a memory 204, such as WIP memory 310'. The message status may include a message identifier and in some embodiments a status, such as in progress or complete. Message identifiers may include a message dependency identifier, such as a message serial chain number, for example MSG 110-1, MSG 110-2, or the like. In another embodiment, the dependency checker may determine message dependency based on an appended message identifier, for example, if message B is dependent on message A, message B may include the message A message identifier. In some embodiments, the message status may also include a message dependency map which may identify the dependency of a plurality of messages and their respective relationships.

As shown at block 414 of FIG. 4, the apparatus 200 may include means, such as a processor 202, communications interface 206, or the like, configured to receive a message process completion indication. The processor 202 may receive the message process completion indication from the communications interface 206, which may in turn receive the message process completion message indication from the downstream system 106.

As shown at block 416 of FIG. 4, the apparatus 200 may include means, such as a processor 202, memory 204, or the like, configured to update the message status. The processor 202 may update the message status stored in a memory 204. The processor 202 may update the message status by removing the message identifier from the memory, or changing a status to process complete, indicating that the message is no longer being processed. In some example embodiments, the processor 202 may additionally or alternatively update a message dependency map.

The processor 202 may start a recalculate process, for example by setting a recalculate flag. In response to starting the recalculate process and/or updating one or more message statuses, the processor 202 may determine if one or more of the messages stored in the memory 204 are dependent on unprocessed messages, as described above in block 406.

As shown at block 418 of FIG. 4, the apparatus 200 may include means, such as a processor 202, a communications interface 206, or the like, configured to receive a message error indication. The processor 202 may receive the message error indication from the communications interface 206, which may in turn receive the message error indication from an upstream system 106 using wired or wireless communication. The message error indication may be received in response to an unsuccessful processing of the message by the upstream system 106.

As shown at block 420 of FIG. 4, the apparatus 200 may include means, such as a processor 202, or the like, configured to determine if the number of message transmissions exceeds a predetermined retry threshold. The processor 202 may determine the number of times the message has been transmitted. The number of transmissions may be determined by a transmission count appended to the message status or other transmission counters. The processor 202 may compare the number of transmissions of the message to a predetermined retry threshold, for example three transmissions, four transmissions, or any other number of transmissions.

In an instance in which the retry threshold is not satisfied the process may continue at block 422, by retransmitting the message. In an instance in which the retry threshold is satisfied the process may continue at block 424

As shown at block 422 of FIG. 4, the apparatus 200 may include means, such as a processor 202, communications interface 206, or the like, configured to retransmit the message. The processor 202 may cause the communications interface to transmit the message to the upstream system 106 using wired or wireless communication. In some example embodiments the processor may increment a message transmission counter associated with the transmitted message.

As shown at block 424 of FIG. 4, the apparatus 200 may include means, such as a processor 202, a communication interface 206, or the like, configured to transmit an error message. The processor 202 may cause the communications interface 206 to transmit an error message to the upstream system 104, downstream system 106, a memory 204, such as an error log, or the like. The error message may be used to analyze system operations.

As shown in block 426 of FIG. 4, the apparatus 200 may include means, such as a processor 202, or the like, configured to update the message status and terminate transmission of the message. In an instance in which the message is being transmitted or is in the communications interface 206 transmission queue, the processor 202 may terminate the message transmission and/or remove the message from a transmission queue. In some example embodiments the processor 202 may update the status message as complete, complete with error, or the like, to allow processing and transmission of dependent messages. Although not shown, the process may continue at 406, by determination of message dependency on unprocessed messages. The processor 202 may treat the message associated with the error as processed by determining dependent messages to no longer be dependent.

In some example embodiments, the processor 202 may append a dependent message error to the dependent message. The message dependency error indication may indicate that one or more superior messages have not been processed, or an error was received in association with the message.

As shown in block 428 of FIG. 4, the apparatus 200 may include means, such as a processor 202, or the like, configured to determine if processing time exceeds a predetermined timeout threshold. The processor 202 may start a counter at block 408 upon transmission of the message to the downstream system 106. The timer may be compared to a predetermined timeout threshold, such as 30 seconds, 1 minute, or any other time interval. The timer may be stopped or reset by receiving a message process completion indication from the downstream system 106. In an instance in which the timer value satisfies the predetermined timeout threshold, the processor may cause the transmission of an error as described at block 424 and/or cause the retransmission of the message as described at block 422.

In some example embodiments, the processor may additionally or alternatively determine if the number of message transmissions satisfies the predetermined retry threshold as described at block 420.

As shown in block 430 of FIG. 4, the apparatus 200 may include means, such as a processor 202, memory 204, or the like, configured to remove processed message statuses from memory at a predetermined interval. The processor 202 may remove message statuses based on time such as 5 minutes, 30 minutes, 4 hours, or any other time interval. In an example embodiment, the processor 202 may remove message statuses based on a combination of time and dependency, for example no messages having been received with dependency to the message in the previous 5 minutes. In a further example embodiment, the processor 202 may remove the message statuses based on number of entries, such as retaining the last 50, 100, 200, or the like entries and removing the oldest when a new message status is entered.

The intelligent blocking queue may allow sequential processing of direct, transitive, and multiple dependent messages. Further, utilization of an intelligent blocking queue does not unnecessarily block unrelated messages, due to the use of multiple processing elements. This may result in more robust dependency determinations and allow non-dependent messages to be processed without waiting for dependent messages which may have arrived first. This may be especially important in an instance in which downstream systems utilize multiple processing elements for scalability, fault tolerance, and performance.

As described above, FIGS. 3 and 4 illustrate flowcharts of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 402, 418, 420, 422, 424, 426, 428, and 430 in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a message, wherein the message comprises a message identifier;
determining if the message is dependent on an unprocessed message;
causing a message status to be stored in a memory, wherein the message status comprises the message identifier;
causing the message to be stored in the memory in an instance in which the message is dependent on an unprocessed message;
receiving a message process completion indication from a downstream system and updating the message status based on the message process completion indication;

determining if the message stored in the memory continues to be dependent on an unprocessed message based on the updated message status;

causing the transmission of the message to the downstream system in an instance in which the message is no longer dependent on an unprocessed message;

receiving a message error indication from the downstream system;

causing a retransmission of the message to the downstream system;

determining if a number of message transmissions satisfies a predetermined retry threshold, wherein causing the retransmission of the message is based on the determination of the number of transmissions satisfying the predetermined retry threshold; and causing the removal of the message status based on a combination of time and dependency.

2. The method of claim 1 further comprising:
determining if the memory is full; and
in an instance in which the memory is not full, receiving a message.

3. The method of claim 1 further comprising:
determining if a message processing time satisfies a predetermined timeout threshold; and
causing the transmission of an error indication in an instance in which the message processing time satisfies the timeout threshold.

4. The method of claim 1 further comprising:
removing the message identifier from memory at a predetermined interval.

5. The method of claim 1, wherein the message identifier further includes a message dependency identifier.

6. An apparatus comprising at least one processor and at least one memory including computer program code, the at least one memory and computer program code configured to, with the processor, cause the apparatus to at least:

receive a message, wherein the message comprises a message identifier;

determine if the message is dependent on an unprocessed message;

cause a message status to be stored in a memory, wherein the message status comprises a message identifier;

cause a message to be stored in a memory in an instance in which the message is dependent on an unprocessed message;

receive a message process completion indication from a downstream system and updating the message status based on the message process completion indication;

determine if the message is dependent on an un-transmitted message based on the updated message status;

cause the transmission of the message to the downstream system in an instance in which the message is not dependent on an unprocessed message;

receive a message error indication from the downstream system;

cause a retransmission of the message to the downstream system;

determine if a number of message transmissions satisfies a predetermined retry threshold, wherein causing the retransmission of the message is based on the determination of the number of transmissions satisfying the predetermined retry threshold; and cause the removal of the message status based on a combination of time and dependency.

7. The apparatus of claim 6, wherein the at least one memory and the computer program code are further configured to:

determine if the memory is full, wherein a message is received in an instance in which the memory is not full.

8. The apparatus of claim 6, wherein the at least one memory and the computer program code are further configured to:

determine if a message processing time satisfies a predetermined timeout threshold; and
cause the transmission of an error indication in an instance in which the message processing time satisfies the timeout threshold.

9. The apparatus of claim 6, wherein the at least one memory and the computer program code are further configured to:

remove the message identifier from memory at a predetermined interval.

10. The apparatus of claim 6, wherein the message identifier further includes a message dependency identifier.

11. A computer program product comprising at least one non-transitory computer-readable storage medium having computer-executable program code portions stored therein, the computer-executable program code portions comprising program code instructions configured to:

receive a message, wherein the message comprises a message identifier;

determine if the message is dependent on an unprocessed message;

cause a message status to be stored in a memory, wherein the message status comprises a message identifier;

cause the message to be stored in a memory in an instance in which the message is dependent on an unprocessed message;

receive a message process completion indication from a downstream system and updating the message status based on the message process completion indication;

determine if the message is dependent on an un-transmitted message based on the updated message status;

cause the transmission of the message to the downstream system in an instance in which the message is not dependent on an unprocessed message;

receive a message error indication from the downstream system;

cause a retransmission of the message to the downstream system;

determine if a number of message transmissions satisfies a predetermined retry threshold, wherein causing the retransmission of the message is based on the determination of the number of transmissions satisfying the predetermined retry threshold; and cause the removal of the message status based on a combination of time and dependency.

12. The computer program product of claim 11, wherein the computer-executable program code portions further comprise program code instructions configured to:

determine if the memory is full, wherein a message is received in an instance in which the memory is not full.

13. The computer program product of claim 11, wherein the computer-executable program code portions further comprise program code instructions configured to:

determine if a message processing time satisfies a predetermined timeout threshold; and
cause the transmission of an error indication in an instance in which the message processing time satisfies the timeout threshold.

14. The computer program product of claim 11, wherein the computer-executable program code portions further comprise program code instructions configured to:

remove the message identifier from memory at a predetermined interval.

* * * * *